United States Patent
Fauque

(10) Patent No.: US 7,218,252 B2
(45) Date of Patent: May 15, 2007

(54) SYSTEM AND METHOD FOR CHARACTER CONVERSION BETWEEN CHARACTER SETS

(75) Inventor: Scott A. Fauque, Bolingbrook, IL (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/861,800

(22) Filed: Jun. 4, 2004

(65) Prior Publication Data

US 2005/0184886 A1    Aug. 25, 2005

Related U.S. Application Data

(60) Provisional application No. 60/547,763, filed on Feb. 25, 2004.

(51) Int. Cl.
*H03M 7/00* (2006.01)
(52) U.S. Cl. .......................... 341/50; 341/106; 341/51; 341/50
(58) Field of Classification Search .................. 341/50, 341/90, 106, 51
See application file for complete search history.

(56) References Cited

U.S. PATENT DOCUMENTS

| | | | |
|---|---|---|---|
| 4,670,890 A | 6/1987 | Titchener | |
| 5,005,137 A | 4/1991 | Ernst | |
| 5,225,833 A | 7/1993 | Fisher et al. | |
| 5,649,214 A | 7/1997 | Bruso et al. | |
| 5,787,452 A | 7/1998 | McKenna et al. | |
| 5,924,091 A * | 7/1999 | Burkhard | 707/7 |
| 5,995,963 A * | 11/1999 | Nanba et al. | 707/6 |
| 6,247,048 B1 | 6/2001 | Greer et al. | |
| 6,400,287 B1 | 6/2002 | Ehrman | |
| 6,425,123 B1 | 7/2002 | Rojas et al. | |
| 6,658,625 B1 | 12/2003 | Allen | |
| 6,766,296 B1 | 7/2004 | Adachi | |

FOREIGN PATENT DOCUMENTS

EP    1076419    2/2001

OTHER PUBLICATIONS

Davis, Mark, "Forms of Unicode," *Unicode Consortium, IBM*, Sep. 1999, pp. 1-8 <http://www-124.ibm.com/icu/docs/papers/forms_of_unicode/>, visited Oct. 7, 2004.

(Continued)

*Primary Examiner*—Jean Bruner Jeanglaude
(74) *Attorney, Agent, or Firm*—Pillsbury Winthrop Shaw Pittman, LLP

(57) ABSTRACT

A system and method for converting character sets are provided. In one embodiment, the method includes populating a conversion character array based on a character string and a conversion character string, with the character string represented in a first character set and the conversion character string comprising the character string represented in a second character set. A conversion status array is populated for the character string at least partially based on the conversion character array. A dataset is then selected and the dataset is represented in the first character set. The dataset is converted into the second character set based, at least in part, on the conversion character array and the conversion status array.

39 Claims, 6 Drawing Sheets

OTHER PUBLICATIONS

Cifuentes, C. et al.; "Recovery of Jump Table Case Statements from Binary Code"; Program Comprehension, 1999 Proceedings; 7th International Workshop; IEEE Comput. Soc.; May 1999; pp. 192-199, no month.

Swan T.; "A CASE of the Jumps (Pascal CASE Statements)"; The Institution of Electrical Engineers, Stevenage, GB; May 1988, no month.

International Search Report issued in PCT Application No. PCT/US2005/004931; May 13, 2005; 7 pages.

* cited by examiner

|     | 0 | 1 | 2 | 3 | 4 | 5 | 6 | 7 | 8 | 9 | A | B | C | D | E | F |
|-----|---|---|---|---|---|---|---|---|---|---|---|---|---|---|---|---|
| +00 | 0 | 0 | 0 | 0 | 0 | 0 | 0 | 0 | 0 | 0 | 0 | 0 | 0 | 0 | 0 | 0 |
| +10 | 0 | 0 | 0 | 0 | 0 | 0 | 0 | 0 | 0 | 0 | 0 | 0 | 0 | 0 | 0 | 0 |
| +20 | 0 | 0 | 0 | 0 | 0 | 0 | 0 | 0 | 0 | 0 | 0 | 0 | 0 | 0 | 0 | 0 |
| +30 | 0 | 0 | 0 | 0 | 0 | 0 | 0 | 0 | 0 | 0 | 0 | 0 | 0 | 0 | 0 | 0 |
| +40 | 0 | 0 | 0 | 0 | 0 | 0 | 0 | 0 | 0 | 0 | 0 | 0 | 0 | 0 | 0 | 0 |
| +50 | 0 | 0 | 0 | 0 | 0 | 0 | 0 | 0 | 0 | 0 | 0 | 0 | 0 | 0 | 0 | 0 |
| +60 | 0 | 0 | 0 | 0 | 0 | 0 | 0 | 0 | 0 | 0 | 0 | 0 | 0 | 0 | 0 | 0 |
| +70 | 0 | 0 | 0 | 0 | 0 | 0 | 0 | 0 | 0 | 0 | 0 | 0 | 0 | 0 | 0 | 0 |
| +80 | 80 | 81 | 82 | 83 | 84 | 85 | 86 | 87 | 88 | 89 | 8A | 8B | 8C | 8D | 8E | 8F |
| +90 | 90 | 91 | 92 | 93 | 94 | 95 | 96 | 97 | 98 | 99 | 9A | 9B | 9C | 9D | 9E | 9F |
| +A0 | A0 | A1 | A2 | A3 | A4 | A5 | A6 | A7 | A8 | A9 | AA | AB | AC | AD | AE | AF |
| +B0 | B0 | B1 | B2 | B3 | B4 | B5 | B6 | B7 | B8 | B9 | BA | BB | BC | BD | BE | BF |
| +C0 | C0 | C1 | C2 | C3 | C4 | C5 | C6 | C7 | C8 | C9 | CA | CB | CC | CD | CE | CF |
| +D0 | D0 | D1 | D2 | D3 | D4 | D5 | E6 | D7 | D8 | D9 | DA | DB | DC | DD | DE | DF |
| +E0 | E0 | E1 | E2 | E3 | E4 | E5 | E6 | E7 | E8 | E9 | EA | EB | EC | ED | EE | EF |
| +F0 | F0 | F1 | F2 | F3 | F4 | F5 | F6 | F7 | F8 | F9 | FA | FB | FC | FD | FE | FF |

SYSTEM AND METHOD FOR CHARACTER CONVERSION BETWEEN CHARACTER SETS

RELATED APPLICATION

This application claims the priority under 35 U.S.C. §119 of provisional application Ser. No. 60/547,763 filed Feb. 25, 2004.

TECHNICAL FIELD

This disclosure generally relates to data conversion and more particularly to a system and method for character conversion between character sets.

BACKGROUND

Coded character sets, such as Single Byte Character Set (SBCS) and Unicode Character Set Transformation Format-8 (UTF-8), are used to represent the characters of various national languages. As computer applications evolve to support a greater range of national languages, the demand for providing multiple characters often increases. Computer hardware and software typically represent specific sets of characters in code points, such as one to four bytes. 8-bit (or 1-byte) representation is typically limited to a set of two hundred fifty-six (256) distinct characters. For example, SBCS assigns a unique byte to each character in a set of 256 characters. In comparison, UTF-8 for example, a multibyte UNICODE encoding, encodes a code point as a sequence of one to four bytes, thereby allowing UTF-8 to represent more than 65,000 unique characters. Conventionally, a native conversion engine of an operating system performs translation between two character sets including examples SBCS and UTF-8.

SUMMARY

In one embodiment, a system and method for converting character sets are provided. In one embodiment, the method includes populating a conversion character array based on a character string and a conversion character string, with the character string represented in a first character set and the conversion character string comprising the character string represented in a second character set. A conversion status array is populated for the character string at least partially based on the conversion character array. A dataset is then selected and the dataset is represented in the first character set. The dataset is converted into the second character set based, at least in part, on the conversion character array and the conversion status array. The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram illustrating an exemplary conversion system for providing direct conversion between character sets;

FIGS. 2A–D illustrate example conversion character arrays and conversion status files illustrated in FIG. 1.

DETAILED DESCRIPTION

Figures 1, 2A:
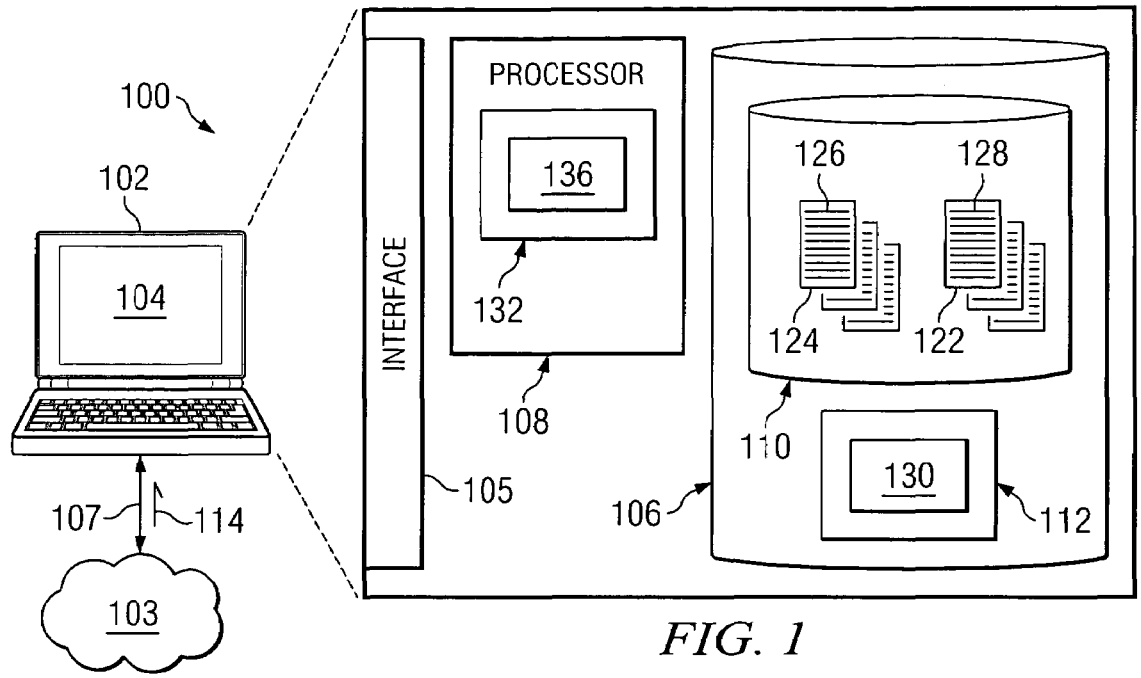

FIG. 1 illustrates one embodiment of a conversion computer system 100 for providing direct conversion between character sets. A character set is a group of integer values that represents symbols, letters, numbers, or other characters for use by a computer such as Single Byte Character Set (SBCS) (EDCIDIC CCSID 273), Multi Byte Character Set (MBCS), Unicode, or a Unicode encoding form such as Unicode Character Set Transformation Format 8 (UTF-8), UTF-16, UTF-16BE, UTF-16LE, or UTF-32. This disclosure contemplates that character strings may be converted between character sets based, for example, on the length of individual characters. For example, the character string "AB" has a length of two bytes and may be represented as X'C1C2'. In another example, the character string "AB" is a two character string that has a length of three bytes; the first character is one byte and the second character is two bytes. This example character string may be represented as X'C1D091'. After determining the length of individual characters, system 100 may invoke local conversion or native conversion based on the determined lengths. At a high level, system 100 may include a single computer 102 or any portion of a distributed system including a network 103. For example, computer 102 may comprise a portion of an information management system or enterprise network that provides a number of software applications to any number of clients. Alternatively, computer 102 may comprise a client requesting conversion services from an information management system or enterprise network via one or more software applications. In either case, system 100 is any system that dynamically selects local or native conversion services, illustrated as 136 and 130 respectively, to convert a dataset, such as a character string, between character sets. In certain embodiments, some of the disclosed techniques may reduce, minimize, or eliminate unnecessary processor utilization and/or memory usage.

Computer 102 includes a Graphical User Interface (GUI) 104, network interface 105, memory 106, and processor 108. The present disclosure includes a repository of conversion character arrays 122 and a repository of conversion status arrays 124 that may be stored in memory 106 and may be processed by processor 108. FIG. 1 only provides one example of a computer that may be used with the disclosure. The present disclosure contemplates computers other than general purpose computers as well as computers without conventional operation systems. As used in this document, the term "computer" is intended to encompass a mainframe, a personal computer, a client, a server, a workstation, a network computer, a personal digital assistant, a mobile phone, or any other suitable local or remote processing device. Moreover, "computer 102" and "user of computer 102" may be used interchangeably without departing from the scope of this disclosure. Computer 102 may be operable to receive input from and present output through GUI 104.

GUI 104 comprises a graphical user interface operable to allow the user of computer 102 to interact with processor 108. Generally, GUI 104 provides the user of computer 102 with an efficient and user-friendly presentation of data provided by computer 102. GUI 104 may comprise a plurality of displays having interactive fields, pull-down lists, and buttons operated by the user. And in one example, GUI 104 presents an explore-type interface and receives commands from the user. It should be understood that the term graphical user interface may be used in the singular or in the plural to describe one or more graphical user interfaces in each of the displays of a particular graphical user interface.

Further, GUI 104 contemplates any graphical user interface, such as a generic web browser, that processes information in computer 102 and efficiently presents the information to the user. Network 103 can accept data from the user of computer 102 via the web browser (e.g., Microsoft Internet Explorer or Netscape Navigator) and return the appropriate HTML or eXtensible Markup Language (XML) responses.

Computer 102 may include network interface 105 for communicating with other computer systems over network 103 such as, for example, in a client-server or other distributed environment via link 107. In certain embodiments, computer 102 may generate requests and/or responses and communicate them to a client, server, or other computer systems located in network 103. Network 103 facilitates wireless or wireline communication between computer system 100 and any other computer. Network 103 may communicate, for example, Internet Protocol (IP) packets, Frame Relay frames, Asynchronous Transfer Mode (ATM) cells, voice, video, data, and other suitable information between network addresses. Network 103 may include one or more local area networks (LANs), radio access networks (RANs), metropolitan area networks (MANs), wide area networks (WANs), all or a portion of the Internet, and/or any other communication system or systems at one or more locations. Generally, interface 105 comprises logic encoded in software and/or hardware in any suitable combination to allow computer 102 to communicate with network 103 via link 107. More specifically, interface 105 may comprise software supporting one or more communications protocols associated with link 107 and communications hardware operable to communicate physical signals.

Memory 106 may include any memory or database module and may take the form of volatile or non-volatile memory including, for example, magnetic media, optical media, Random Access Memory (RAM), Read Only Memory (ROM), removable media, or any other suitable local or remote memory component. In the illustrated embodiment, memory 106 includes a repository 110 and an operating system 112. Repository 110 comprises any logical or physical storage for the management and retrieval of suitable information. According to one embodiment, repository 110 comprises a relational database, such as Database 2 (DB2) or Oracle, normally accessed through Structured Query Language (SQL) statements. Relational databases use sets of schemas to describe the tables, columns and relationships in the tables using basic principles known in the field of database design. Alternatively, repository 110 may comprise XML documents, an object-oriented database, flat files, Btrieve files, VSAM files, name-value-pair files or comma-separated-value (CSV) files. In the illustrated embodiment, repository 110 includes one or more conversion character arrays 122 and one or more conversion status arrays 124, but may include any other data, as appropriate. It will be understood that conversion character array 122 and conversion status array 124 may be temporary or persistent, as well as local or remote, without departing from the scope of this disclosure. Moreover, it will be understood that conversion character array 122 and conversion status array 124 may each represent a portion of one file, array, or object without departing from the scope of this disclosure. For example, conversion character array 122 may be populated and stored in two fields of a record seconds, hours, or months prior to conversion status array 124, which may be generated or populated in two other fields of the same record.

Conversion character array 122 comprises instructions, data mappings, algorithms, or any other directive used by computer 102 to populate conversion status array 124 and to convert characters in a dataset 114 from a first to a second character set. As used herein, convert means to swap, translate, transition, or otherwise modify one or more characters. Conversion character array 122 may be any suitable format such as, for example, an XML document, a flat file, CSV file, a name-value pair file, SQL table, an array, an object, or others. Conversion character array 122 may be any suitable data structure such as an array, matrix, list, table, or any other suitable structure that maps a character from a first to a second character set. In one embodiment, conversion character array 122 is an array of conversion strings 128. For example, conversion character array 122 may be arranged as a matrix with each entry comprising a conversion string 128. Conversion character array 122 may be dynamically created or populated by computer 102, a third-party vendor, any suitable user of computer 102, loaded from a default file, or received via network 103. The term "dynamically" as used herein, generally means that the appropriate processing is determined at run-time based upon the appropriate information. Moreover, conversion character array 122 may be accessed one or more times over a period of a day, a week, or any time specified by the user of computer 102, as well as at run-time, so long as it may suitably provide conversion string 128 substantially upon request.

Conversion string 128 is one entry or instruction in array 122, which maps a character in one character set to the character in another character set. For example, conversion string 128 may comprise a code point in UTF-8 that is associated with a code point in SBCS where both conversion string 128 and the associated SBCS code point map to the same logical character. Conversion string 128 may comprise a character, such as one of length one to four bytes, or any other numeric or non-numeric sequence or value such that computer 102 may identify a corresponding character. Further, conversion string 128 may be stored in binary, hexadecimal, or any other suitable base or format. It will be understood that a first and second character set may include disparate characters and, thus, an associated character may not have a corresponding conversion string 128. In this case, the array entry associated with that character may comprise an arbitrary entry, the associated character, or any other suitable entry. In short, conversion character array 122 may provide a conversion string 128 for each character of the first character set or, alternatively, provide a conversion string 128 for a subset of the first character set. Additionally, conversion character array 122 may comprise a subset of the converted characters in the first character set. For example, conversion character array 122 may include a certain number of the most commonly converted characters or a set of invariant characters between character sets. In the case of invariant characters, all numerics in Extended Binary-Coded Decimal Interchange Code (EBCDIC) (x'F0' thru x'F9') are the same for all EBCDIC code pages. Computer 102 may process each conversion string 128 of a conversion character array 122 to populate an associated conversion status array 124.

At least partially based upon conversion character array 122, computer 102 generates a conversion status array 124. Each conversion status array 124 comprises rules, instructions, algorithms, or any other directive used by computer 102 to determine whether to invoke native or local character conversion for a selected dataset. As used herein, select means to initiate communication with, initiate retrieval of, or otherwise identify a dataset. Conversion status array 124 may be any suitable format such as, for example, an XML document, a flat file, CSV file, a name-value pair file, SQL table, an array, an object, or others. In one embodiment, conversion status array 124 is a matrix of conversion statuses 126, where each conversion status 126 is associated with a corresponding conversion string 128. Conversion status arrays 124 may be dynamically created by computer 102, by a third-party vendor, or any suitable user of computer 102, loaded from a default file, or received via network 103. Moreover, generated conversion status arrays 124 may be accessed one or more times over a period of a day, a week, or a time specified by the user of computer 102, as well as at run-time, to provide conversion status 126.

Conversion status 126 indicates whether computer 102 should directly convert the associated character in the first character set to a character in the second character set. As used herein, "directly convert" includes converting a character from a first to a second character set based upon a corresponding conversion string 128 or other local components. Conversion status 126 may be any appropriate data type, including float, integer, currency, decimal, string, or any other numeric or non-numeric format that indicates whether an associated character is directly convertible. Indeed, conversion status 126 may be stored in binary, hexadecimal, or any other suitable base or format. For example, conversion status 126 may comprise a hexadecimal zero byte x'00' indicating the associated character is directly convertible. It will be understood that conversion status array 124 may not include a conversion status 126 for each of the characters in a character set. In this case, conversion status array 124 may be associated with a subset of the converted characters in the first character set.

Operating system 112 manages basic operations of computer 102 and may provide a software platform on top of which application software, such as application 132, may run. Operating system 112 typically determines how computer 102 apportions memory 106, manages the flow of information to and from processor 108, or other suitable functions. Operating system 112 may be WINDOWS, Unix, Mac, Linux, z/OS, any mainframe operating system, or any other suitable operating system. It will be understood that while operating system 112 is illustrated as a single multi-tasked module, the features and functionality performed by this operating system is normally performed by multiple modules. For example, operating system 112 may dynamically invoke one or more software modules including native character conversion service 130.

Native character conversion service 130 facilitates conversion of a received dataset 114 between the first character set and the second character set. Native character conversion service 130 may receive dataset 114 from the user of computer 102, from a process running on computer 102, via network 103, or any other suitable technique. Native character conversion service 130 is often further operable to communicate the converted dataset 114 to the requesting process or user of computer 102. For example, native character conversion service 130 may receive dataset 114 including SBCS characters and communicate a conversion of the SBCS characters in corresponding UTF-8 characters. While illustrated as part of operating system 112, native character conversion service may be callable or invokable functions or services offered by a programming language. Alternatively, native character conversion service 130 may be a remote service running on a disparate computer in network 103 and operable to receive and process requests from computer 102.

Processor 108 executes instructions and manipulates data to perform operations of computer 102. Although FIG. 1 illustrates a single processor 108 in computer 102, multiple processors 108 may be used according to particular needs, and reference to processor 108 is meant to include multiple processors 108 where applicable. In the illustrated embodiment, processor 108 executes application 132 at any appropriate time such as, for example, in response to a request or input from the user of computer 102 or any appropriate computer system coupled with network 103. Application 132 is any suitable application software running on computer 102. For example, application 132 may comprise a database program, conversion program, or any other software application that is operable to generate conversion character array 122 and conversion status array 124 and to at least partially determine the process to use to convert a selected dataset. Application 132 may communicate all or a portion of the selected dataset 114 to native character conversion service 130 and receive a conversion of that which was communicated to native character conversion service 130. Additionally, application 132 may be operable to retrieve a conversion status 126 and a corresponding conversion string 128 from repository 110. Application 132 may be based on any appropriate computer language such as, for example, C, C++, Java, Perl, Visual Basic, 4GL, and others. It will be understood that while application 132 is illustrated as a single multitasked module, the features and functionality performed by this engine may be performed by multiple modules. For example, application 132 may include or invoke local character conversion service 136 operable to, among other things, i) retrieve a conversion status 126 and/or conversion string 128 from repository 110 and ii) convert one or more characters in dataset 114 based on conversion status 126 and/or conversion string 128. Moreover, application 132 may comprise a child or submodule of another software module, not illustrated, without departing from the scope of this disclosure.

In one aspect of operation, system 100 executes two high-level steps for converting between character sets: (1) generating or otherwise populating conversion character array 122 and conversion status array 124; and (2) determining whether to invoke local character conversion services 136 or native character conversion services 130. It will be understood that the generated conversion character array 122 and conversion status array 124 may be generated in sequence or in parallel with each other, as well as with the determination step. Additionally, application 132 may perform these steps in response to a request or input from a user or a process running on computer 102 or network 103.

During the generation step, application 132 communicates a character string in a first character set with a request to convert the communicated character string into a second character set to native character conversion service 130. It will be understood that while described as generation, this disclosure contemplates that "generating" means populating, modifying, or verifying the respective component such that it is suitable for the appropriate task. The character string may comprise all or a subset of the characters in the first character set. In one embodiment, the character string comprises a 256-byte string of characters. Native character conversion service 130 receives the communicated character string request and converts the communicated character string into the second character set, which is then returned to application 132. Application 132 process a first character in the converted character string and stores a corresponding conversion string 128 in conversion character array 122. If the corresponding conversion string 128 satisfies any suitable criteria, such as including characters less than or equal to a particular length, then conversion status 126 is stored in conversion status array 124 indicating such. Otherwise, conversion status 126 indicates that the criteria is not satisfied and is stored in conversion status array 124. This process is repeated for any additional characters in the converted character string. This generation step may be employed to generate conversion character arrays 122 and conversion status arrays 124 for any appropriate character sets. For example, application 132 may comprise logic illustrated in the pseudo code listed below to generate conversion character array 122 and conversion status arrays 124 for conversion from SBCS to UTF-8.

In the example pseudo code, initially N=0 and Y=256 (hexadecimal x'FF'). I256 represents 256 byte storage that contains hexadecimal values of x'00' through x'FF' (SBCS code point ('character') values). UTF8_SBCS represents an array where each entry is one byte and contains Y number of entries (i.e. number of SBCS code points ('characters')). UTF8_SBCS_CHK represents an array of Y number of entries and each entry represents an attribute of the corresponding entry in UTF8_SBCS. This array's value will initially be set to I256 except for the first entry which can be set to x'01'. SBCS_UTF8 represents an array where each entry is one byte and contains Y number of entries (i.e. number of 1 byte UTF-8 characters). SBCS_UTF8_CHK represents an array of Y number of entries and each entry represents an attribute of the corresponding entry in SBCS_UTF8. This array's value will initially be set to I256 except for the first entry which can be set to x'01'. Based on these initial conditions, the example pseudo code illustrates the following:

```
INPUT: I256 (X' 00' . . . X' FF')
OUTPUT: U8_256CP as converted UTF-8 output string representing
    256 code points ('characters') having a length >= 256
    While N < Y
        Let CP be code point N within the string U8_256CP
        If length of CP is one byte (bit pattern 0xxxxxxx)
            Let UTF8_SBCS(CP) = N
            Let UTF8_SBCS_CHK(CP) = X' 00' that indicates the
                corresponding UTF-8 code point ('character') is
                directly convertible
            Let SBCS_UTF8(N) = CP
            Let SBCS_UTF8_CHK(N) = x' 00' that indicates
                that corresponding SBCS code point ('character') is
                directly convertible
        EndIf
        Increment N by X' 01'
    EndWhile
```

It will be understood that this exemplary pseudo code applies to situations where there is a one to one code unit (byte) transitive relationship between the SBCS code points and the UTF-8 code points, but similar processing may be employed to encompass local translation between, for example, SBCS and one or two byte UTF-8 code points. In other words, the example pseudo code is for illustration purposes only and application 132 may comprise any logic (represented by none, some, or all of the illustrated pseudo code as well as that not illustrated) operable to generate or populate conversion character array 122 and conversion status array 124.

Turning the determination step, after application 132 constructs conversion character array 122 and conversion status array 124, application 132 determines whether to invoke local character conversion service 136 or native character conversion service 130 to convert a selected dataset 114 in a first character set to a second character set. It will be understood that this determination may be based on any appropriate characteristic of conversion string 128 such as, for example, byte length, frequency of use, invariance between character sets, or any other appropriate characteristic. It will be further understood that while FIG. 1 illustrates dataset 114 as being communicated across network 103, this is for example purposes only and dataset 114 may be locally selected, generated, or identified without departing from the scope of this disclosure. To start, application 132 processes the first character of the selected dataset 114 for conversion. Based upon the first character, application 132 retrieves a conversion status 126 associated with the first character. If conversion status 126 indicates that the associated character is directly convertible to a second character set, then application 132 will repeat this determination sequence for all remaining characters in the source character string up until a single character is determined to be not directly convertible. If it has been determined that each of the characters in the source character string is associated with one conversion status 126 indicating that it should be directly convertible, then each character in the source character string is converted to the corresponding character in the second character set by using data maps stored in conversion character array 122. If at least one character could not be directly converted, then application 132 communicates the entire character string to the native character conversion service 130, which converts the character string to the corresponding character(s) in the second character set. For example, application 132 may include logic similar to the example pseudo code listed below to determine whether to employ local or native conversion between from SBCS characters and to UTF-8 characters.

To build on the exemplary pseudo code described above, SBCSIN represents the set of SBCS characters as input, i.e. the selected dataset, (treated as an array of single characters). UTF8OUT represents the set of UTF-8 characters as output with an initial length equal to zero. SBCS_UTF8_CHK represents the 256-byte character array (or conversion status array 124) that determines if local conversion from SBCS to UTF-8 is possible or if native character conversion services are needed to be called. Initially M=1, SL=length in bytes of SBCSIN, and DIRECT_CONVERSION=1. Based upon these initial conditions, the example pseudo code includes the following:

```
While M <= SL
    Let SINDEX = value of the byte in SBCSIN(M)
    If SBCS_UTF8_CHK(SINDEX) is not equal X' 00'
        Let DIRECT_CONVERSION = 0
        Exit While loop
    EndIf
    Increment M by 1
EndWhile
If DIRECT_CONVERSION = 0
    Invoke existing native character conversion services with
        INPUT:SBCSIN
        OUTPUT:UTF8OUT
Else
    Let M = 1
    Let SL = length in bytes of SBCSIN
    While M <= SL
        Let SINDEX = value of the byte in SBCSIN(M)
        Let UTF8OUT = UTF8OUT concatenated with byte at
            SBCS_UTF8(SINDEX)
        Increment M by 1
    EndWhile
EndIf
```

Figure 3A:
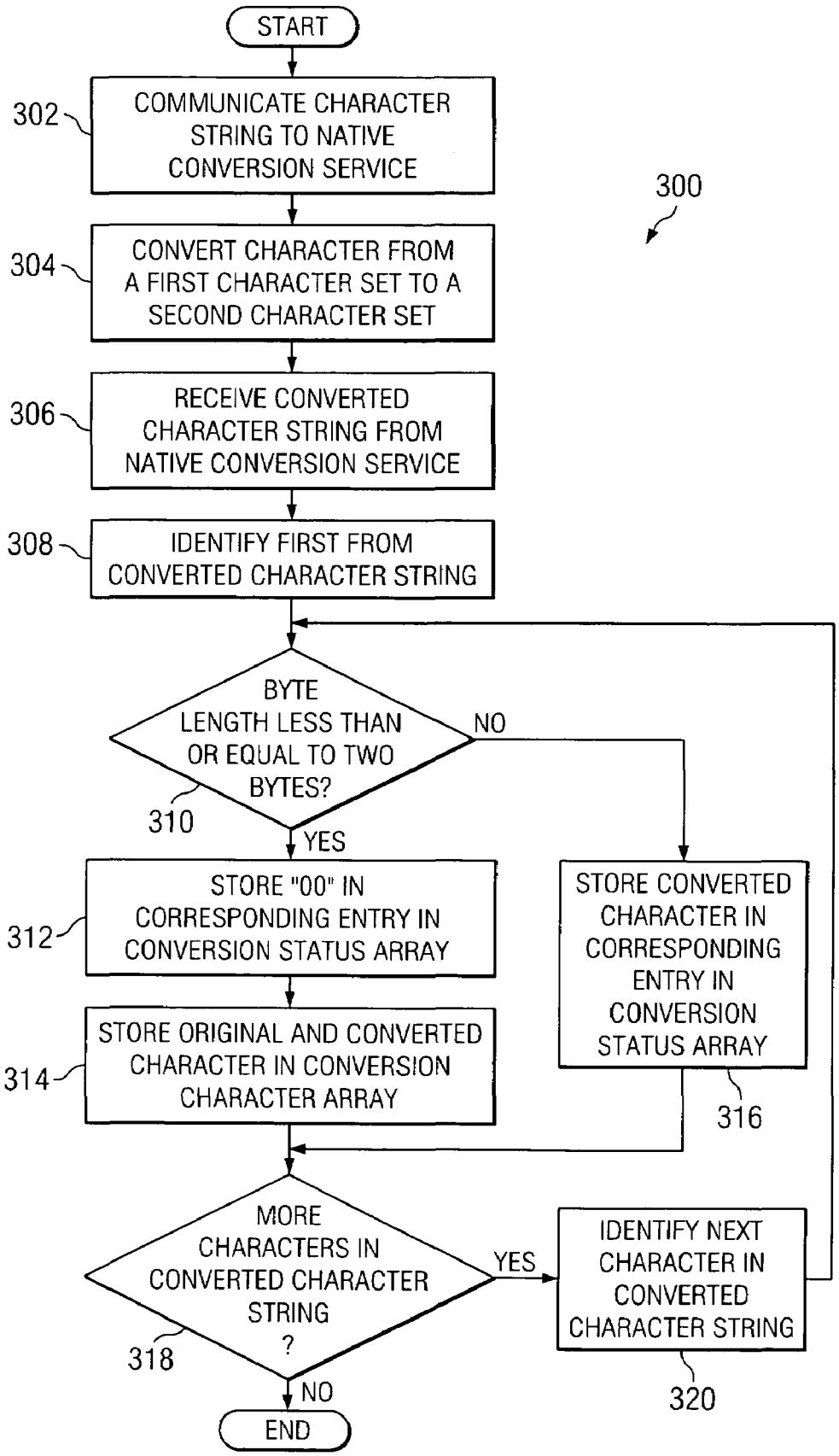
FIGS. 3A–B are exemplary flow diagrams illustrating example methods for providing conversion between a plurality of character sets.
Figure 3B:
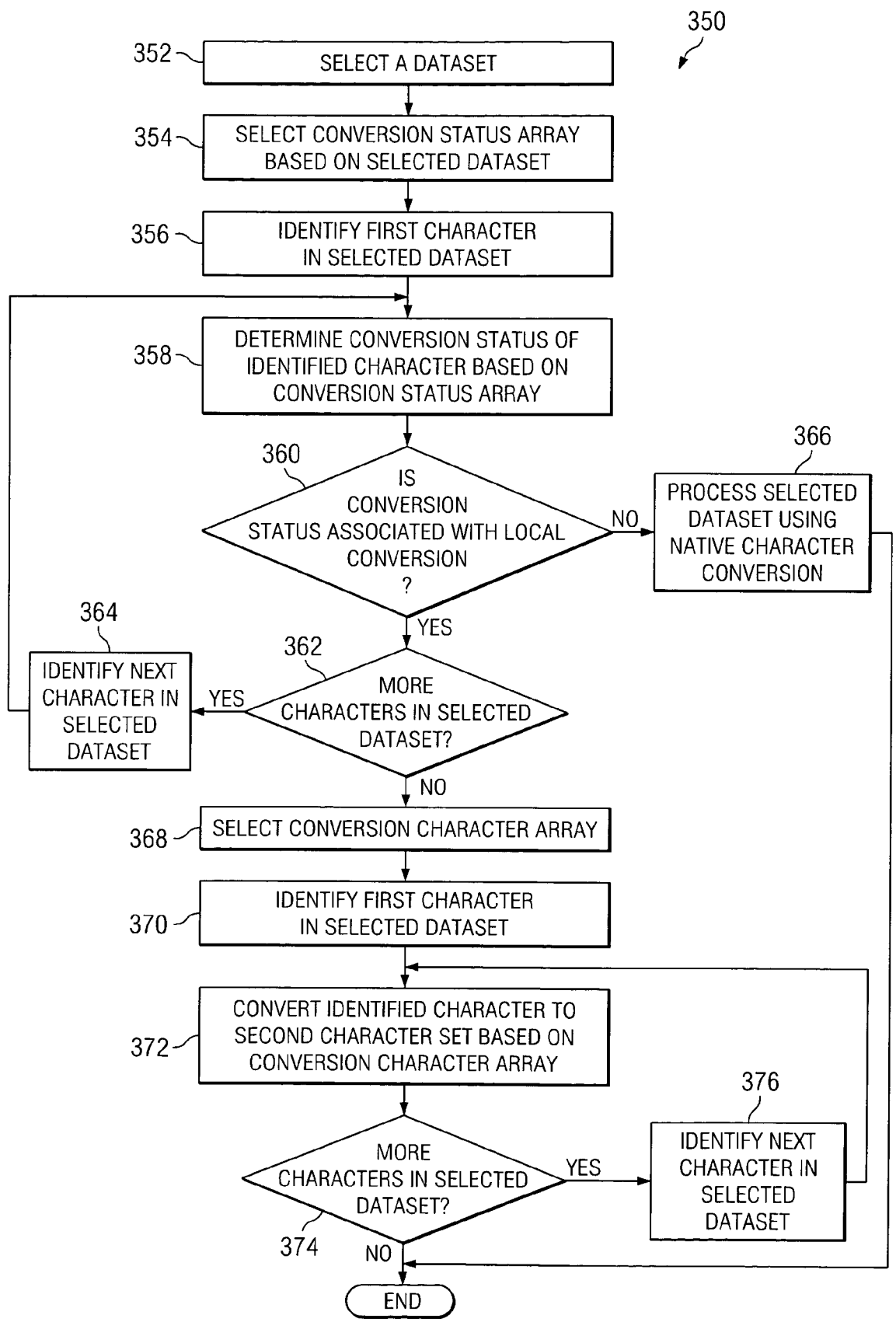

As mentioned above, it will be understood that the example pseudo code is for illustration purposes only and application 132 may comprise any logic (including that illustrated) operable to determine whether to employ native or local conversion, such as that illustrated in example FIGS. 3A–B.

Figure 2B:
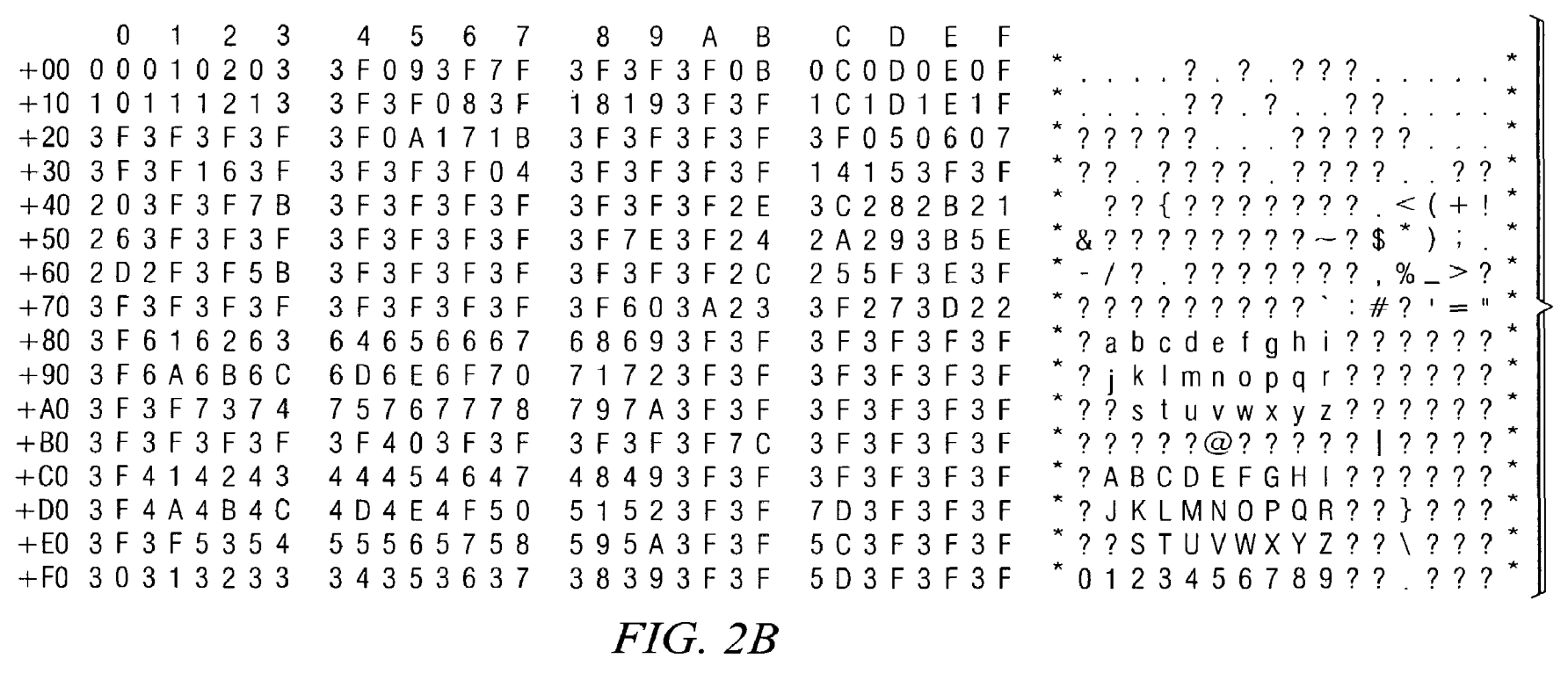
Figure 2D:
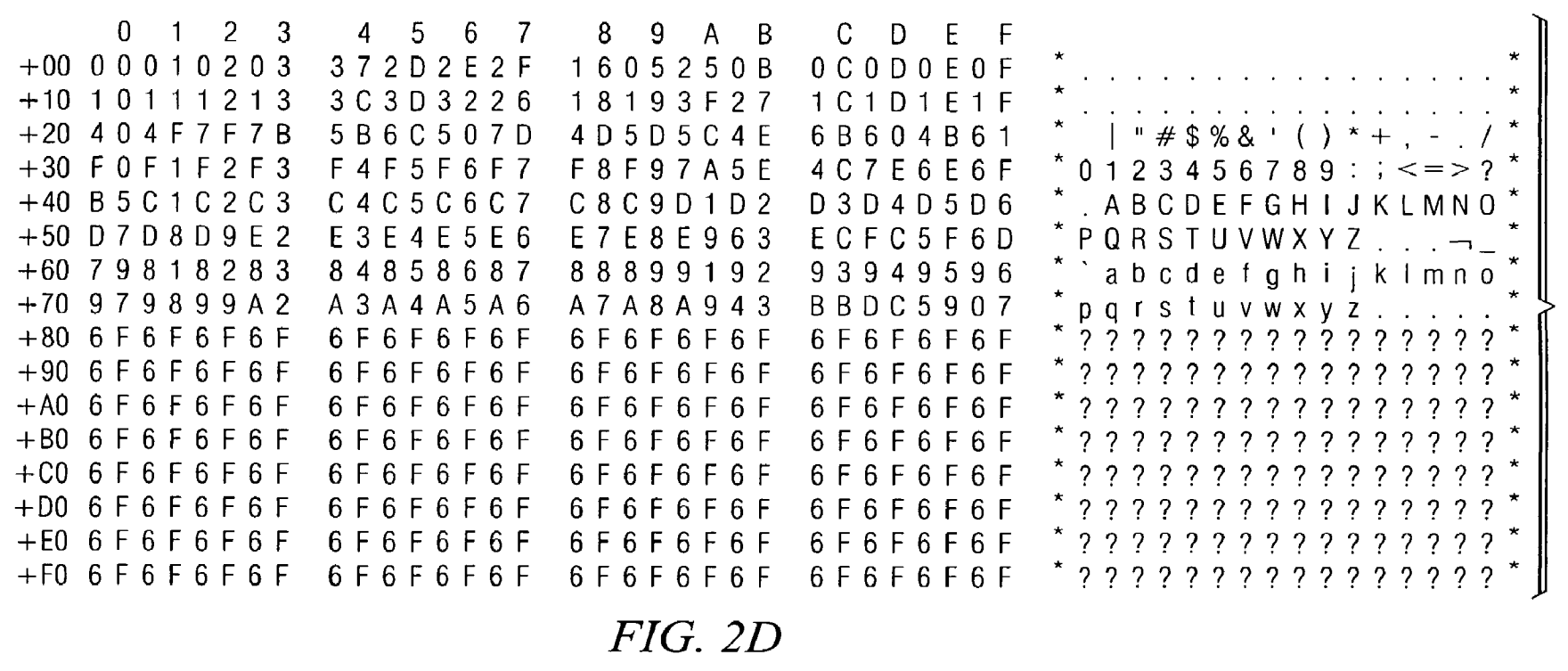

FIGS. 2A–D illustrate one embodiment of conversion character arrays 122 and conversion status arrays 124 that may be accessed by application 132 and local character conversion service 138. Using these exemplary arrays, application 132 provides direct conversion between SBCS and UTF-8. As illustrated, each conversion status 126 and each conversion string 128 is written in hexadecimal. As discussed in detail above, each entry of these matrices is associated with a code point, or character, in a first character set. For example, each entry in FIGS. 2A and 2B is associated with characters in SBCS. For comparison, each entry in FIGS. 2C and 2D are associated with characters in UTF-8. Conversion status array 124 illustrated in FIGS. 2A and 2C include entries with the hexadecimal zero byte indicating that the associated character has a corresponding character in the second character set less than or equal to one byte. For example, entry at offset X'25' (5, 20) of FIG. 2A is x'00' indicating that the corresponding conversion string 128 in FIG. 2B is less than one byte, i.e., entry at offset X'25' of FIG. 2B is '0A' or 10 in base 10. It will be understood that the various components of the illustrated arrays may be combined or omitted and additional components may be added according to particular needs. Additionally, the illustrated arrays may be utilized using the exemplary code of local character conversion service 136 as listed above. It will be understood that these are only exemplary arrays and other features, functionalities, and data may be implemented without varying from the scope of this disclosure.

FIGS. 3A–B are flow diagrams illustrating example methods 300 and 350, respectively, for generating or populating a conversion status array 124 and converting a particular dataset. Methods 300 and 350 are described with respect to system 100 of FIG. 1, but methods 300 and 350 could each be used by any other system or components. Moreover, system 100 may use any other suitable techniques for performing these tasks. Thus, many of the steps in this flowchart may take place simultaneously and/or in different orders as shown. Further, system 100 may execute logic implementing techniques similar to one or both of methods 300 and 350 in parallel or in sequence. System 100 may also use methods with additional steps, fewer steps, and/or different steps, so long as the methods remain appropriate.

At a high level, method 300 illustrates an example technique for generating or populating conversion status array 124 and method 350 illustrates an example technique for invoking local or native conversion based, at least in part, on conversion status array 124. Method 300 begins at step 302, where application 132 communicates a character string to native character conversion service 130 with the character string represented in a first character set. For example, the character string may comprise all characters or characters of the SBCS character set. As discussed above, native character conversion service 130 may be a process operable to run on computer 102 or on a remote computer system via network 103. At step 304, native character conversion service 130 converts or otherwise translates the communicated characters in the first character set to the second character set. In this example, the character string is converted from SBCS to UTF-8. Next, at step 306, native character conversion service 130 returns the converted character string to application 132 via any suitable manner. At step 308, application 132 processes a first character from the converted character string. If the byte length of the character is less than or equal to two bytes at decisional step 310, then application 132 stores a hexadecimal zero byte x'00' in the corresponding entry of conversion status array 124 at step 312. Returning to the example, if the first character is associated with the SBCS character x'02', then, as illustrated in FIG. 2A, the corresponding entry in (2,00) is the hexadecimal zero byte x'00' indicating that the associated SBCS character x'02' is directly convertible to UTF-8. Next, at step 314, application 132 stores the converted character in conversion character array 122. Referring again to the example, the converted character, i.e., the UTF-8 character x'02', is stored in the entry (2,00) associated with the SBCS character x'02', as illustrated in FIG. 2B. In this case, the SBCS and UTF-8 character are invariant. If the byte length is greater than two byte at decisional step 310, then, at step 316, application 132 stores the character in the first character set in conversion status array 124 and an arbitrary value in conversion character array 122, such as a character for a question mark. In the example, if the first character is associated with the SBCS character x'20', then, as illustrated in FIG. 2A, the corresponding entry is the character x'20' indicating that the converted character is greater than one byte. Thus, in this example, the corresponding entry in the conversion character array 122 is the UTF-8 character x'3F' which maps to the question mark. At decisional step 318, if the converted character string includes an additional character, then execution returns to decisional step 310. If there are no additional characters in the converted character string, then the execution proceeds to step 320. In short, application 132 has generated or populated conversion character array 122 and conversion status file 124 and is now ready to determine an appropriate conversion process for selected dataset 114 at any suitable time.

As mentioned above, FIG. 3B illustrates example method 350, which generally describes the determination step executed by application 132. At step 352, a dataset 114 is selected, received, generated, or otherwise identified for conversion from the first character set to the second character set. For example, dataset 114 may comprise the first and second SBCS characters x'20' and x'02'. Next, at step 354, application 132 selects a conversion status array 124 based on the selected dataset. For example, if dataset 114 is represented in the first character set, then application 132 may identify conversion status array 124 that includes a conversion status for the first character set. Application 132 identifies the first character from the selected dataset at step 356. It will be understood that the first character may or may not be the first sequential character in the dataset. Next, at step 358, application 132 dynamically determines a corresponding conversion status 126 based, at least in part, on conversion status array 124. As discussed above, conversion statuses for x'20' and x'02' are x'20' and x'00' respectively. If conversion status 126 is not associated with local conversion at decisional step 360, then, at step 366, dataset 114 is processed by native conversion service 130. In one embodiment, this may comprise application 132 communicating dataset 114 to native conversion service and receiving the converted dataset at any subsequent time. If the particular conversion status 126 is associated with local conversion, then application 132 continues to process dataset 114 until a conversion status is not associated with local conversion or all characters have been suitably compared using steps 362 and 364. Once dataset 114 has been suitably compared with conversion status array 124 and if all component characters may be local converted, then application 132 selects or otherwise identifies conversion character array 122 at step

368. Next, at step 370, application 132 identifies the first character in the selected dataset using any suitable criteria. As with above, the first character may or may not be the first sequential character in the dataset. Application 132 then converts the identified character from the first character set to the second character set based, at least in part, on the selected conversion character array 122. Next, at decisional step 374, application 132 determines if there are remaining unconverted characters in dataset 114. If there are additional characters, then application 132 identifies the next character at step 376 and processing returns to step 372. Once there are no remaining unconverted characters at decisional step 374, processing ends.

Although this disclosure has been described in terms of certain embodiments and generally associated methods, alterations and permutations of these embodiments and methods will be apparent to those skilled in the art. For example, the native conversion service may be invoked across network 103 using a distributed architecture. Accordingly, the above description of example embodiments does not define or constrain this disclosure. Other changes, substitutions, and alterations are also possible without departing from the spirit and scope of this disclosure.

What is claimed is:

1. A method for converting between character sets, the method comprising:
    generating a conversion character array that maps characters from a first character set into a second character set, the conversion character array being generated based on a conversion of a character string into a conversion character string, wherein the characters in the character string are represented in the first character set and wherein the characters in the conversion character string include the characters of the character string represented in the second character set;
    generating a conversion status array that corresponds to the conversion character array, the conversion status array comprising a plurality of entries that indicate which characters in the first character set are to be converted from the first character set to the second character set based on the conversion character array;
    selecting a dataset including characters, the characters being represented in the first character set;
    converting the dataset into the second character set, wherein converting the dataset includes (i) identifying, based on the conversion status array, the characters in the dataset that should be converted into the second character set using the conversion character array, and (ii) using the conversion character array to convert the identified characters in the dataset; and
    storing the dataset, as converted into the second character set, in a memory.

2. The method of claim 1, wherein the character string comprises a 256-byte character string.

3. The method of claim 1, wherein the first character set comprises a Single Byte Character Set (SBCS) and the second character set comprises a Multi-Byte Character Set (MBCS).

4. The method of claim 1, wherein the first character set comprises a Unicode encoding form and the second character set comprises SBCS.

5. The method of claim 1, wherein:
    the character string comprises a first character value that corresponds to a first character and a second character value that corresponds to a second character;
    the dataset comprises the first character and the second character;
    the conversion character array comprises a first data map and a second data map, the first data map maps the first character value in the first character set to the first character value in the second character set and the second data map maps the second character value in the first character set to the second character value in the second character set; and
    the conversion status array comprises a first entry and a second entry of the plurality of entries and the first entry is associated with the first character value and the second entry is associated with the second character value.

6. The method of claim 5, wherein converting the dataset into the second character set based, at least in part, on the conversion character array and the conversion status array comprises:
    identifying the first entry in the conversion status array based on the first character; and
    in response to the first entry comprising zero, identifying the second entry in the conversion status array based on the second character.

7. The method of claim 6, wherein in response to the first entry not comprising zero, the method further comprises communicating the dataset to a native conversion service.

8. The method of claim 6, wherein in response to the second entry comprising zero, a local conversion service:
    converting the first character based on the first data map; and
    converting the second character based on the second data map.

9. The method of claim 6, wherein in response to the second entry not comprising zero, the method further comprises communicating the dataset to a native conversion service.

10. The method of claim 1, further comprising:
    communicating the character string to a native character conversion service, the character string represented in a first character set; and
    populating the conversion character array based, at least in part, on the conversion character string generated by the native conversion service.

11. The method of claim 1, wherein a native character conversion service performs the conversion between character sets, the native character conversion service comprising a character conversion service offered by an operating system.

12. The method of claim 1, wherein a native character conversion service performs the conversion between character sets, the native character conversion service comprising a callable character conversion service by a programming language.

13. The method of claim 1, wherein the conversion character array is manually populated.

14. Software stored on a computer readable medium for converting between character sets, the software being operable when executed to:
    generate a conversion character array that maps characters from a first character set into a second character set, the conversion character array being generated based on a conversion of a character string into a conversion character string, wherein the characters in the character string are represented in the first character set and wherein the characters in the conversion character string include the characters of the character string represented in the second character set;
    generate a conversion status array that corresponds to the conversion character array, the conversion status array comprising a plurality of entries that indicate which characters in the first character set are to be converted from the first character set to the second character set based on the conversion character array;

select a dataset including characters, the characters being represented in the first character set;

convert the dataset into the second character set, wherein converting the dataset includes (i) identifying, based on the conversion status array, the characters in the dataset that should be converted into the second character set using the conversion character array, and (ii) using the conversion character array to convert the identified characters in the data set; and store the dataset, as converted into the second character set, in a memory.

15. The software of claim 14, wherein the character string comprises a 256-byte character string.

16. The software of claim 14, wherein the first character set comprises a Single Byte Character Set (SBCS) and the second character set comprises a Multi-Byte Character Set (MBCS).

17. The software of claim 14, wherein the first character set comprises a Unicode encoding form and the second character set comprises SBCS.

18. The software of claim 14, wherein:

the character string comprises a first character value that corresponds to a first character and a second character value that corresponds to a second character;

the dataset comprises the first character and the second character;

the conversion character array comprises a first data map and a second data map, the first data map maps the first character value in the first character set to the first character value in the second character set and the second data map maps the second character value in the first character set to the second character value in the second character set; and the conversion status array comprises a first entry and a second entry of the plurality of entries and the first entry is associated with the first character value and the second entry is associated with the second character value.

19. The software of claim 18, wherein converting the dataset into the second character set based, at least in part, on the conversion-character array and the conversion status array includes:

identifying the first entry in the conversion status array based on the first character; and in response to the first entry comprising zero, identifying the second entry in the conversion status array based on the second character.

20. The software of claim 19, wherein in response to the first entry not comprising zero, the software is further operable to communicate the dataset to a native conversion service.

21. The software of claim 19, wherein in response to the second entry comprising zero, a local conversion service is operable to:

convert the first character based on the first data map; and convert the second character based on the second data map.

22. The software of claim 19, wherein in response to the second entry not comprising zero, the software is further operable to communicate the dataset to a native conversion service.

23. The software of claim 14, further operable to:

communicate the character string to a native character conversion service, the character string represented in a first character set; and populate the conversion character array based, at least in part, on the conversion character string received from the native conversion service.

24. The software of claim 14, wherein a native character conversion service performs the conversion between character sets, the native character conversion service comprising a character conversion service offered by an operating system.

25. The software of claim 14, wherein a native character conversion service performs the conversion between character sets, the native character conversion service comprising a callable character conversion service by a programming language.

26. The software of claim 14, wherein the conversion character array is manually populated.

27. A system for converting between character sets, the system comprising:

memory operable to store a conversion character array that maps characters from a first character set into a second character set and a conversion status array that corresponds to the conversion character array; and one or more processors operable to:

generate the conversion character array based on a conversion of a character string into a conversion character string, wherein the characters in the character string are represented in the first character set and wherein the characters in the conversion character string include the characters of the character string represented in the second character set;

generate the conversion status array comprises a plurality of entries that indicate which characters in the first character set are to be converted from the first character set to the second character set based on the conversion character array;

select a dataset including characters, the characters being represented in the first character set;

convert the dataset into the second character set, wherein converting the dataset includes (i) identifying, based on the conversion status array, the characters in the dataset that should be converted into the second character set using the conversion character array, and (ii) using the conversion character array to convert the identified characters in the dataset; and store the dataset, as converted into the second character set, in the memory.

28. The system of claim 27, wherein the character string comprises a 256-byte character string.

29. The system of claim 27, the first character set comprises a Single Byte Character Set (SBCS) and the second character set comprises a Multi-Byte Character Set (MBCS).

30. The system of claim 27, wherein the first character set comprises a Unicode encoding form and the second character set comprises SBCS.

31. The system of claim 27, wherein:

the character string comprises a first character value that corresponds to a first character and a second character value that corresponds to a second character;

the dataset comprises the first character and the second character;

the conversion character array comprises a first data map and a second data map, the first data map maps the first character value in the first character set to the first character value in the second character set and the second data map maps the second character value in the first character set to the second character value in the second character set; and the conversion status array comprises a first entry and a second entry, and the first entry is associated with the first character value and the second entry is associated with the second character value.

32. The system of claim 31, wherein converting the dataset into the second character set based, at least in part, on the conversion character array and the conversion status array comprises:

Identifying the first entry in the conversion status array based on the first character; and in response to the first entry comprising zero, identifying the second entry in the conversion status array based on the second character.

33. The system of claim 32, wherein in response to the first entry not comprising zero, the one or more processors are further operable to communicate the dataset to a native conversion service.

34. The system of claim 32, wherein in response to the second entry comprising zero, a local conversion service is further operable to:

convert the first character based on the first data map; and convert the second character based on the second data map.

35. The system of claim 32, wherein in response to the second entry not comprising zero, one or more characters in the dataset are communicated to a native conversion service.

36. The system of claim 27, wherein the one or more processors are further operable to:

communicate the character string to a native character conversion service; and generate the conversion character array based, at least in part, on the conversion character string received from the native conversion service.

37. The system of claim 27, wherein a native character conversion service performs the conversion between character sets, the native character conversion service comprising a character conversion service offered by an operating system.

38. The system of claim 27, wherein a native character conversion service performs the conversion between character sets, the native character conversion service comprising a callable character conversion service by a programming language.

39. The system of claim 27, wherein the conversion character array is manually populated.

* * * * *